(12) United States Patent
Fuehrer

(10) Patent No.: US 9,323,718 B2
(45) Date of Patent: Apr. 26, 2016

(54) METHOD AND DEVICE FOR OPERATING A DRIVER ASSISTANCE SYSTEM OF A VEHICLE

(71) Applicant: Thomas Fuehrer, Stuttgart-Weilimdorf (DE)

(72) Inventor: Thomas Fuehrer, Stuttgart-Weilimdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 27 days.

(21) Appl. No.: 13/733,299

(22) Filed: Jan. 3, 2013

(65) Prior Publication Data

US 2013/0184930 A1  Jul. 18, 2013

(30) Foreign Application Priority Data

Jan. 9, 2012  (DE) .......................... 10 2012 200 216

(51) Int. Cl.

| | |
|---|---|
| *B60K 28/00* | (2006.01) |
| *G06F 17/00* | (2006.01) |
| *B62D 15/02* | (2006.01) |
| *B60W 30/10* | (2006.01) |
| *B60W 30/14* | (2006.01) |
| *B60W 50/00* | (2006.01) |
| *B60W 50/06* | (2006.01) |

(52) U.S. Cl.
CPC .............. *G06F 17/00* (2013.01); *B62D 15/025* (2013.01); *B60W 30/10* (2013.01); *B60W 30/14* (2013.01); *B60W 2050/008* (2013.01); *B60W 2050/0077* (2013.01); *B60W 2050/0089* (2013.01); *B60W 2050/065* (2013.01)

(58) Field of Classification Search
USPC ............. 701/1, 25, 29.6, 31.4, 33.4, 32.3, 36, 701/70; 340/439; 702/113
See application file for complete search history.

(56) References Cited

U.S. PATENT DOCUMENTS

| | | | | |
|---|---|---|---|---|
| 5,642,093 | A * | 6/1997 | Kinoshita ............ | B60K 28/066 180/167 |
| 7,079,927 | B1 * | 7/2006 | Tano ...................... | G01C 21/26 701/25 |

\* cited by examiner

*Primary Examiner* — Adam Tissot
(74) *Attorney, Agent, or Firm* — Kenyon & Kenyon LLP

(57) ABSTRACT

A method for operating a driver assistance system of a vehicle, includes providing and using data for making a decision as to whether or not the driver assistance system is to provide a driver assistance function, detecting a vehicle position when the driver assistance function is provided, and assigning the detected vehicle position to the used data to create a set of driver assistance system data. A device for operating a driver assistance system of a vehicle, as well as a vehicle system for a vehicle and a computer program are also described.

24 Claims, 2 Drawing Sheets

METHOD AND DEVICE FOR OPERATING A DRIVER ASSISTANCE SYSTEM OF A VEHICLE

CROSS REFERENCE TO RELATED APPLICATION

The present application claims priority to Application No. DE 10 2012 200 216.2, filed in the Federal Republic of Germany On Jan. 9, 2012, which is incorporated herein in its entirety by reference thereto.

FIELD OF INVENTION

The present invention relates to a method and a device for operating a driver assistance system of a vehicle. The present invention furthermore relates to a vehicle system for a vehicle as well as a computer program.

BACKGROUND INFORMATION

Driver assistance systems are known per se. They usually use data to decide whether or not a driver assistance function is to be provided. Here, it is often necessary to subsequently analyze the used data after a trip of the vehicle.

SUMMARY

An object underlying the present invention may thus be seen as providing a method and a device for operating a driver assistance system of a vehicle which allows for an efficient analysis of data which are relevant for the decision as to whether or not the driver assistance system is to provide a driver assistance function.

An object underlying the present invention may also be seen as providing a corresponding vehicle system as well as a corresponding computer program.

According to one aspect, a method for operating a driver assistance system of a vehicle is provided. Data are provided, the data being used for making a decision as to whether or not the driver assistance system is to provide a driver assistance function.

If the driver assistance function is provided, a vehicle position is detected. This detected vehicle position is assigned to the used data to create a set of driver assistance system data. This therefore means, in particular, that the set of driver assistance system data includes, on the one hand, the used data which have led to the decision that the driver assistance system provides the driver assistance function. On the other hand, the set of driver assistance system data of the detected vehicle position includes corresponding vehicle position data.

According to another aspect, a device for operating a driver assistance system of a vehicle is provided. In this case, a decision device is provided which is designed to decide whether or not a driver assistance function is to be provided based on the provided and used data. Furthermore, a vehicle position detection device for detecting a vehicle position is provided. The vehicle position detection device detects the vehicle position when the driver assistance function is provided. Furthermore, an assigner is provided for assigning the vehicle position to the used data to create a set of driver assistance system data.

According to another aspect, a vehicle system for a vehicle is provided which includes a driver assistance system and the device for operating a driver assistance system of a vehicle. The vehicle system may, in particular, also be referred to as a system for a vehicle.

Furthermore, a computer program is provided which includes program code for carrying out the method for operating a driver assistance system of a vehicle when the computer program is run on a computer.

The present invention also includes the idea of using the data provided to the driver assistance system to make a decision as to whether or not the driver assistance system is to provide a driver assistance function. Here, it may, in particular, be provided that the data are transmitted to the vehicle, for example, by an external server, which is situated externally from the vehicle, and/or by other vehicles. This therefore means, in particular, that the vehicle does not necessarily produce these data itself with the aid of a vehicle-internal sensor system, for example, such data produced with the aid of the vehicle-internal sensor system also being usable, in particular. The data are preferably produced with the aid of sensor systems of other vehicles, including surroundings sensors for sensory detection of vehicle surroundings, and are transmitted directly to the vehicle and/or to a central server which then may transmit the data to the vehicle. The communication between the vehicle and the other vehicles may, in particular, be carried out with the aid of a car-to-car communication process. In particular, the communication between the vehicle and the central or external server may be carried out with the aid of a car-to-infrastructure communication process and/or a mobile radio communication process. In the case of a positive decision, i.e., in particular, that the driver assistance function is to be provided, the instantaneous vehicle position is detected at the point in time of the provision of the driver assistance function. The detected vehicle position is then assigned to the used data to create a set of driver assistance system data.

In this way, it is advantageously made possible that a filtering of the used data may be carried out based on the detected vehicle position. Therefore, it is advantageously made possible, for example, that it may be subsequently displayed to the driver on a digital map, i.e., in particular, after a trip, in which positions the driver assistance system has provided the driver assistance function.

Data in the sense of the present invention include, in particular, vehicle surroundings data which include, in particular, information regarding the vehicle surroundings. Such information may, for example, relate to physical objects. A physical object may, for example, be a traffic sign, a signaling system, another vehicle, or roadside guiding posts. The vehicle surroundings data, in particular, include physical properties or characteristics of the road, such as a street width, a roadway width, radiuses of curves, and/or ramps. In particular, in the case of stationary physical objects, the particular positions and dimensions are stored in the vehicle surroundings data. Vehicle surroundings data may, in particular, also include information regarding instantaneous conditions such as that road work is being done in a corresponding position, resulting in changed road properties. Vehicle surroundings data may, in particular, also include roadway lane data which, for example, include the information regarding a roadway line color. Vehicle surroundings data in the sense of the present invention include, in particular, image, video, radar and/or ultrasound data. The data are, in particular, assigned a corresponding position related to physical objects of the vehicle surroundings.

A vehicle assistance system in the sense of the present invention, in particular, refers to a system which may intervene semi-autonomously or autonomously in a drive system and/or a control system, e.g., an accelerator system, a brake system, a steering system and/or a signaling system of the vehicle. A driver assistance system in the sense of the present invention may, in particular, also warn a driver with the aid of a corresponding human-machine interface shortly before or during a critical situation.

According to one exemplary embodiment, a driver assistance system may, for example, be an anti-lock braking system, a traction control system, an adaptive high-beam assistant, a night vision assistant, a braking assistant, an automatic emergency braking system, an adaptive cruise control (ACC), a lane detection system, a lane keeping support system, a lane departure warning system, a lane change support system, an electronic stability program system, or a parking aid system. Multiple driver assistance systems may preferably also be provided which may, in particular, have identical or differing designs.

A driver assistance function, in particular, refers to the function which may be provided by the driver assistance system to assist or support the driver or, in particular, to intervene in a vehicle operation. If the driver assistance system provides its driver assistance function, an intervention in a vehicle operation takes place, in particular.

According to one exemplary embodiment, a driving mode parameter, in particular multiple driving mode parameters, is/are detected at the point in time of the provision of the driver assistance function and assigned to the set of driver assistance system data. In this way, a filtering of the set of driver assistance system data is advantageously made possible based on the driving mode parameter. This therefore means, in particular, that the driver is subsequently able to efficiently filter the used data, i.e., in particular after a trip, according to the driving mode parameter and is thus, in particular, able to only have the data of interest to him displayed quickly and easily from a large amount of data.

In another exemplary embodiment, other driving mode parameters are detected during the use of the data until the point in time of the provision and assigned to the set of driver assistance system data. This therefore means, in particular, that, while the driver assistance system is still computing whether or not it should provide the driver assistance function, other driving mode parameters are detected until the point in time of the provision, these other driving mode parameters being assigned to the set of driver assistance system data. This therefore means, in particular, that the set of driver assistance system data additionally includes the other driving mode parameters. A filtering of the set of driver assistance system data according to the other driving mode parameters is thus subsequently advantageously possible in an efficient and effective manner, thus facilitating a corresponding analysis of the used data.

According to one exemplary embodiment, the driving mode parameters, i.e., the driving mode parameter and the other driving mode parameters, may be the vehicle operation parameters. A vehicle operation parameter may, for example, be a vehicle speed, a vehicle acceleration, a driving direction of the vehicle, a braking of the vehicle, a vehicle steering maneuver, a vehicle transverse acceleration, a yaw rate of the vehicle tires, or a vehicle steering angle.

In another exemplary embodiment, the driving mode parameters may be sensor parameters of an activity sensor for sensory detection of an activity of a vehicle occupant, in particular, a driver. This therefore means, in particular, that an occupant's behavior, in particular a driver's behavior, is detected. It may thus be detected, for example, whether the driver or the occupant has operated a radio or a phone or what steering angle the driver has set. In this way, it is advantageously made possible that it may be determined after the trip how the occupant or the driver behaved at the point in time of the provision of the driver assistance function and, in particular, additionally their behavior chronologically before the point in time of the provision. In this way, an even more extensive analysis of the used data is advantageously made possible. Furthermore, an accident analysis may be carried out in a simplified manner, if necessary.

In another exemplary embodiment, it may be provided that the driving mode parameters are operating mode parameters corresponding to an operating mode of the driver assistance system. This therefore means, in particular, that an operating mode of the driver assistance system is detected. It may be provided, in particular, that operating mode parameters corresponding to an operating mode are detected by one or many more driver assistance systems. This therefore means, in particular, that an operating mode is detected by other driver assistance systems. This means that it is detected, for example, whether or not other driver assistance systems are active. In this way, it may be subsequently advantageously retraced whether or not the other driver assistance systems have provided their respective driver assistance functions.

According to another exemplary embodiment, the driving mode parameters are vehicle surroundings parameters corresponding to vehicle surroundings. Vehicle surroundings parameters include, in particular, information regarding vehicle surroundings. For example, the vehicle surroundings parameters may include information regarding other detected traffic participants, detected vehicle lanes, detected pedestrians, detected traffic signs, or infrastructures such as road work, bottlenecks, one-way streets, traffic circles, or intersections.

In another exemplary embodiment, it may be provided that the set of driver assistance system data, the used data and/or the vehicle position is/are transmitted to an external memory device situated externally from the vehicle to store the data externally. In this way, archiving the data is advantageously made possible so that the data may be accessed for an analysis even if the vehicle is damaged in an accident, for example. Such an external memory device is, in particular, designed in such a way that the driver or an accordingly authorized person has access to the data only after an authorization.

Exemplary embodiments of the present invention are described below in greater detail with reference to the accompanying drawings.

BRIEF DESCRIPTION OF THE DRAWINGS

The same reference numerals are used below for the same features.

DETAILED DESCRIPTION

Figure 1:
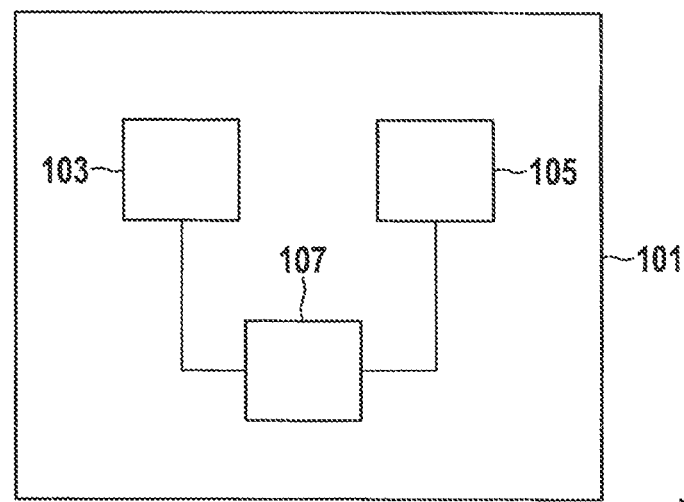
FIG. 1 shows a device for operating a driver assistance system of a vehicle.

FIG. 1 shows a device 101 for operating a driver assistance system (not illustrated) of a vehicle (not illustrated). Device 101 includes a decision device 103 for making a decision as to whether or not a driver assistance function is to be provided based on the provided and used data.

Device 101 furthermore includes a vehicle position detection device 105 for detecting a vehicle position when the driver assistance function is provided. Furthermore, an assigner 107 is provided for assigning the vehicle position to the used data to create a set of driver assistance system data.

Figure 2:
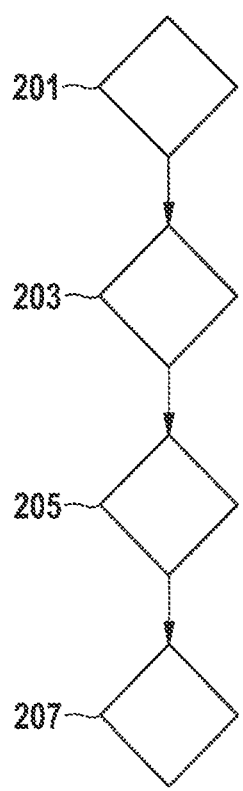
FIG. 2 shows a flow chart of a method for operating a driver assistance system of a vehicle.

FIG. 2 shows a flow chart of a method for operating a driver assistance system of a vehicle. According to a step 201, data are provided. It may, in particular, be provided that the data are transmitted to the vehicle and therefore to the driver assistance system. The data are used according to a step 203 to decide whether or not the driver assistance system is to provide a driver assistance function.

In a step 205, in the case of a positive decision, i.e., in particular, that the driver assistance function will be provided, the vehicle position which is instantaneous at the point in time of the provision is detected.

In a step 207, the vehicle position is assigned to the used data to create a set of driver assistance system data.

Figure 3:
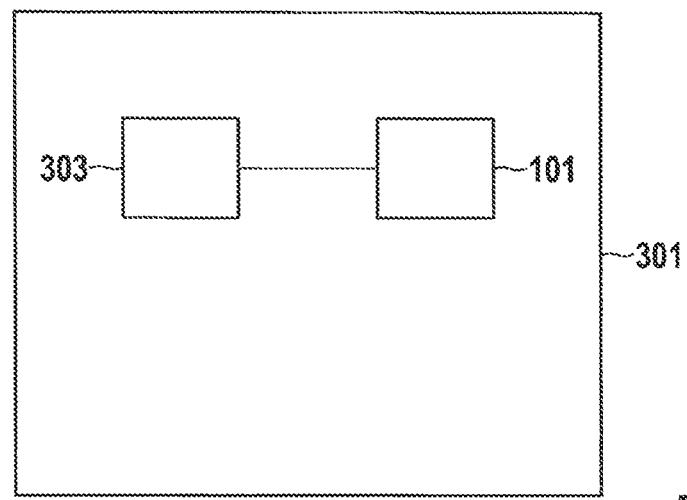
FIG. 3 shows a vehicle system for a vehicle.

FIG. 3 shows a vehicle system 301 for a vehicle. Vehicle system 301 includes a driver assistance system 303 as well as device 101 according to FIG. 1.

Due to the assignment of the vehicle position according to the present invention at the point in time of the provision of the driver assistance function, it is advantageously made possible that the relevant vehicle position may be visually highlighted on a digital map for an analysis of the used data. In particular, a little flag may be used to visually display the vehicle position.

In one exemplary embodiment (not illustrated), it may be provided that other driving mode parameters are detected and assigned to the set of driver assistance system data. In this way, an efficient filtering of the used data according to the driving mode parameters is advantageously made possible. It is thus possible to carry out an analysis, which builds on that, efficiently and effectively.

It may be provided, for example, that the driving mode parameters are vehicle operation parameters which may describe a vehicle behavior.

For example, a vehicle speed, a vehicle acceleration, a driving direction of the vehicle, a braking of the vehicle, a vehicle steering maneuver, a vehicle transverse acceleration, a yaw rate of the vehicle tires, or a vehicle steering angle may be detected, the relevant parameters then being assigned to the set of driver assistance system data for a later corresponding filtering.

In another exemplary embodiment (not illustrated), it may be provided that the set of driver assistance system data is made anonymous. This therefore means, in particular, that personal conclusions regarding the set of driver assistance system data are no longer possible after this set has been made anonymous. In this way, it is advantageously possible to carry out an anonymous comparison of the set of driver assistance system data to other sets of driver assistance system data of other vehicles. The relevant drivers are able to communicate via a social network, for example. It may preferably also be provided that the set of driver assistance system data is compared to a comparison library, including a set of reference data. In another exemplary embodiment (not illustrated), it may be provided that, based on the comparison of the sets of driver assistance system data, that set of driver assistance system data is filtered out which has a minimum number of provisions of a driver assistance function in relation to the other sets of driver assistance system data. This set of driver assistance system data having the minimum number of provisions may, in particular, advantageously create the set of reference data. This exemplary embodiment therefore includes, in particular, the idea to define a number of provisions of a driver assistance function as the criterion for proper driving behavior. The less frequently a driver assistance function had to be provided, the better was a driving behavior of the driver. The best driving behavior thus creates a reference for the driving behavior of other drivers. A set of driver assistance system data may, in particular, be generally referred to as a profile corresponding to the driving behavior, i.e., a driving profile. The set of driver assistance system data having the minimum number of provisions may thus be preferably generally referred to as a reference driving profile.

In another exemplary embodiment (not illustrated), it may be provided that, based on the set of driver assistance system data, an indication is computed as to what happened in the concrete situation which resulted in the provision of the driver assistance function.

In another exemplary embodiment (not illustrated), it may be provided that, based on the set of driver assistance system data, an indication is computed as to what should be improved.

In another exemplary embodiment (not illustrated), it may be provided that, based on the set of driver assistance system data, an indication is computed as to what error was made and what is to be changed in the driving behavior.

In another exemplary embodiment (not illustrated), it may be provided that the set of driver assistance system data is provided to an operator for a manual analysis. The operator may, in particular, make a personal consultation available to the driver of the vehicle.

In another exemplary embodiment (not illustrated), it may be provided that the method is implemented as software or hardware on a computer. It may, in particular, also be provided that the method is carried out as an app for a mobile phone.

To sum up, the present invention, in particular, advantageously makes possible a subsequent efficient and effective analysis of data which have been used with the aid of a driver assistance system in order to decide whether or not the driver assistance system is to provide a driver assistance function.

What is claimed is:

1. A method for operating a driver assistance system of a vehicle, comprising:
   continuously over a time period:
      generating data by a sensor system onboard the vehicle; and
      using the data, by a processing device, to determine whether the driver assistance system should execute a driver assistance function;
   for each of a plurality of cases in which the determination is for the driver assistance function to be executed:
      detecting, by the processing device, a vehicle position when the driver assistance function is executed; and
      assigning, by the processing device, the detected vehicle position to the used data on which basis the respective execution of the function was performed, to create a set of driver assistance system data; and
   providing, by the processing device, an output based on the sets of driver assistance system data, wherein the output at least one of:
      includes a map that includes indications of occurrences of a subset of the plurality of cases at respective positions of the map corresponding to respective locations at which the respective cases are indicated, by the assigned vehicle positions, to have occurred, the subset being selected according to received input of filtering criteria and a determination, based on the respective sets of driver assistance system data of the subset, that the subset of the plurality of cases matches the input filtering criteria; and
      is based on identification in the sets of driver assistance data of a non vehicle-motion operation performed by a vehicle occupant when the respective cases of the execution of the driver assistance function occurred.

2. The method according to claim 1, further comprising: detecting, by the sensor system, a driving mode parameter at a point in time of the provision of the driver assistance function and assigning the driver mode parameter to the set of driver assistance system data.

3. The method according to claim 2, further comprising: detecting, by the sensor system, other driving mode parameters during the use of the data until the point in time of the provision and assigning the other driver mode parameters to the set of driver assistance system data.

4. The method according to claim 3, wherein the driving mode parameters are vehicle operation parameters, including at least one of a vehicle speed, a vehicle acceleration, a driving direction of the vehicle, a braking of the vehicle, a vehicle steering maneuver, a vehicle transverse acceleration, a yaw rate of the vehicle tires, and a vehicle steering angle.

5. The method according to claim 1, wherein the output is based on the identification of the non vehicle-motion operation performed by the vehicle occupant.

6. The method according to claim 3, wherein the driving mode parameters are operating mode parameters corresponding to an operating mode of the driver assistance system.

7. The method according to claim 3, wherein the driving mode parameters are vehicle surroundings parameters corresponding to vehicle surroundings.

8. The method according to claim 1, wherein the output includes display of the map.

9. The method according to claim 1, wherein the set of driver assistance system data is made anonymous.

10. The method according to claim 1, further comprising: comparing the set of driver assistance system data to other sets of driver assistance system data of other vehicles.

11. A method for operating a driver assistance system of a vehicle, comprising:
generating data by a sensor system onboard the vehicle;
using the data, by a processing device, to determine whether the driver assistance system is to perform a driver assistance function;
detecting, by the processing device, a vehicle position when the driver assistance function is executed;
assigning, by the processing device, the detected vehicle position to the data, on which basis the processing device determined that the driver assistance function was to be performed, to create a set of driver assistance system data;
comparing, by the processing device, the set of driver assistance system data to other sets of driver assistance system data of other vehicles; and
based on the comparison, selecting, by the processing device and as a reference profile, that set of driver assistance system data which, compared to all others of the sets, is associated with a fewest number of provisions of a driver assistance function.

12. A device for operating a driver assistance system of a vehicle, comprising:
processing circuitry, the processing circuitry configured to:
continuously over time:
obtain data from a sensor system onboard the vehicle; and
based on the data, determine whether a driver assistance function is to be executed;
for each of a plurality of cases in which the determination is for the driver assistance function to be executed:
detect a vehicle position when the driver assistance function is executed; and
assign the detected vehicle position to the used data on which basis the respective execution of the function was performed, to create a set of driver assistance system data; and
provide an output based on the sets of driver assistance data;
wherein the output at least one of:
includes a map that includes indications of occurrences of a subset of the plurality of cases at respective positions of the map corresponding to respective locations at which the respective cases are indicated, by the assigned vehicle positions, to have occurred, the subset being selected according to received input of filtering criteria and a determination, based on the respective sets of driver assistance system data of the subset, that the subset of the plurality of cases matches the input filtering criteria; and
is based on identification in the sets of driver assistance data of a non vehicle-motion operation performed by a vehicle occupant when the respective cases of the execution of the driver assistance function occurred.

13. A vehicle system for a vehicle, comprising:
a driver assistance system; and
a device for operating the driver assistance system of the vehicle, including processing circuitry, the processing circuitry configured to:
continuously over time:
obtain data from a sensor system onboard the vehicle; and
based on the data, determine whether a driver assistance function is to be executed;
for each of a plurality of cases in which the determination is for the driver assistance function to be executed:
detect a vehicle position when the driver assistance function is executed; and
assign the detected vehicle position to the used data on which basis the respective execution of the function was performed, to create a set of driver assistance system data; and
provide an output based on the sets of driver assistance data;
wherein the output at least one of:
includes a map that includes indications of occurrences of a subset of the plurality of cases at respective positions of the map corresponding to respective locations at which the respective cases are indicated, by the assigned vehicle positions, to have occurred, the subset being selected according to received input of filtering criteria and a determination, based on the respective sets of driver assistance system data of the subset, that the subset of the plurality of cases matches the input filtering criteria; and
is based on identification in the sets of driver assistance data of a non vehicle-motion operation performed by a vehicle occupant when the respective cases of the execution of the driver assistance function occurred.

14. A non-transitory, computer-readable medium having stored thereon a computer program including program code, which, when executed on a computer, performs the following:
continuously over a time period:
receiving data from a sensor system onboard the vehicle; and using the received data to determine whether the driver assistance system should execute a driver assistance function;

for each of a plurality of cases in which the determination is for the driver assistance function to be executed:

detecting a vehicle position when the driver assistance function is executed; and assigning the detected vehicle position to the used data on which basis the respective execution of the function was performed, to create a set of driver assistance system data; and providing an output based on the sets of driver assistance system data, wherein the output at least one of:

includes a map that includes indications of occurrences of a subset of the plurality of cases at respective positions of the map corresponding to respective locations at which the respective cases are indicated, by the assigned vehicle positions, to have occurred, the subset being selected according to received input of filtering criteria and a determination, based on the respective sets of driver assistance system data of the subset, that the subset of the plurality of cases matches the input filtering criteria; and is based on identification in the sets of driver assistance data of a non vehicle-motion operation performed by a vehicle occupant when the respective cases of the execution of the driver assistance function occurred.

15. The method of claim 7, wherein the vehicle surroundings parameters include at least one of: a physical object, a pedestrian, a characteristic of a road along which the vehicle is to travel, an instantaneous condition of the road, and a vehicle lane information.

16. The method of claim 1, wherein the data is captured in a format of at least one of: an image, a video, a radar signal, and ultrasound data.

17. The method of claim 1, further comprising:

transmitting the driver assistance system data to an external memory device for storage.

18. The method of claim 17, wherein the driver assistance system data stored in the external memory device is only accessible to authorized persons.

19. The computer-readable medium of claim 14, wherein the program code is executed on a mobile phone.

20. The method according to claim 5, wherein the operation is of a phone.

21. The method according to claim 5, wherein the operation is of a radio.

22. The method according to claim 5, wherein the operation includes a non-vehicle-operation.

23. The method according to claim 5, wherein the output is further based on information regarding non vehicle-motion operation behavior of vehicle occupants indicated in cases in which a determination is recorded to have been made in other vehicles to execute a respective driver assistance function.

24. The method according to claim 8, wherein the map further includes identifications of locations in which a determination is recorded to have been made in other vehicles to execute a respective driver assistance function.

* * * * *